United States Patent [19] [11] 4,301,460
Miura et al. [45] Nov. 17, 1981

[54] INK EJECTION APPARATUS

[75] Inventors: Masayoshi Miura; Kiyoshi Yamamori; Akira Mizoguchi, all of Kawasaki, Japan

[73] Assignee: Matsushita Electric Industrial Company, Limited, Osaka, Japan

[21] Appl. No.: 113,262

[22] Filed: Jan. 18, 1980

[30] Foreign Application Priority Data

Jan. 19, 1979 [JP] Japan ........ 54/5061
Jan. 20, 1979 [JP] Japan ........ 54/4994

[51] Int. Cl.³ ........ G01D 15/18
[52] U.S. Cl. ........ 346/140 R
[58] Field of Search ........ 346/140

[56] References Cited

U.S. PATENT DOCUMENTS 4,106,032 8/1978 Miura ........ 346/140
4,223,324 9/1980 Yamamori ........ 346/140

*Primary Examiner*—Joseph W. Hartary
*Attorney, Agent, or Firm*—Lowe, King, Price & Becker

[57] ABSTRACT

An ink ejection apparatus comprising an ink ejection unit having a liquid chamber connected to an ink container through a conduit and an air chamber connected to a source of pressurized air. Axially aligned discharge channels are provided to allow the ink in the liquid chamber to be discharged through the discharge channels. A piezoelectric transducer is mounted adjacent to the liquid chamber to generate rapid pressure increases therein to permit ejection of ink droplets to the atmosphere in response to electrical signals. The ink container is also supplied with the pressurized air from the air supply source so that there is a constant stream of air through the discharge channel and there is a static pressure balance between the air and liquid chambers when the air supply source is in operation. To eliminate the problem of pressure imbalance which could occur at the instant the air supply source is energized or de-energized, an arrangement is provided to impart a retarding action to the transitory variation of the pressure in the conduit.

9 Claims, 13 Drawing Figures

INK EJECTION APPARATUS

BACKGROUND OF THE INVENTION

The present invention relates to ink ejection apparatus, and more specifically it relates to such apparatus in which the discharged ink droplets are accelerated by a stream of air supplied from a pressurized air source which is energized during operation of the apparatus.

The air-accelerated ink ejection apparatus disclosed in U.S. Pat. No. 4,106,032 includes an ink ejecting unit having a liquid chamber to which ink is supplied from a liquid container and an air chamber provided forwardly of the liquid chamber and axially aligned discharge channels for discharging ink therethrough into the atmosphere when the pressure inside the liquid chamber is increased rapidly by means of a piezoelectric transducer mounted adjacent to the liquid chamber in response to electrical drive signals applied thereto. The air chamber is constantly supplied with pressurized air from a pressure source when the apparatus is in operation to provide a stream of air that accelerates the discharged ink droplets onto a writing surface. The pressurized air is also supplied to the liquid container so that there is established a static balance between the pressures in the air and liquid chambers. This results in lowering of the minimum operating voltage of the apparatus and ensures that the reproduced image has a minutely changing gradation.

However, when the air supply source is energized or de-energized simultaneously with the starting and stopping of the apparatus, the static pressure balance is momentarily lost due to the fact that the pressures in the air and liquid chambers do not vary at the same rate. This results in the ink emerging spontaneously to the outside or results in the air being forced into the liquid chamber causing an ink backflow. The latter is a more serious problem than the former since it often results in a complete failure of ink ejection thereafter even in the presence of electrical signals applied to the piezoelectric transducer. Similar problems could occur when the air supply source is de-energized.

SUMMARY OF THE INVENTION

An object of the present invention is therefore to eliminate the problem of ink backflow by imparting a retarding action to the transitory pressure variation of the source of pressurized air.

According to one embodiment of the invention, the retarding action is provided by means of a normally closed ON-OFF valve which closes the passage of air to the air chamber when the air supply source remains de-energized. A pressure sensor is provided for detecting when the pressure of air supply source is above a predetermined value to open the ON-OFF valve, whereby the opening of the ON-OFF valve causes the pressure in the air chamber to rise sharply thereafter to permit the apparatus to go into a state of pressure equilibrium. Therefore, the pressure in the air chamber does not exceed the pressure in the liquid chamber during the transitory pressure variation of the air supply source. This prevents the air from introducing into the liquid chamber and thus the ink backflow problem is eliminated.

A combined solution to the problem of ink backflow and the problem of spontaneous ejection of ink is obtained by the provision of a bypass air conduit connected in parallel with the ON-OFF control valve to introduce a portion of air from the air source into the air chamber to allow the air pressure therein to rise gradually so that the pressures in the air chamber and the liquid chamber rise substantially at the same rate.

Another combined solution to the aforesaid problems is obtained by the provision of an intermediate air chamber disposed in the passage leading from the air supply source to the air chamber.

BRIEF DESCRIPTION OF THE DRAWINGS

The invention will be further described by way of example with reference to the accompanying drawings, in which.

DETAILED DESCRIPTION

Figure 1:
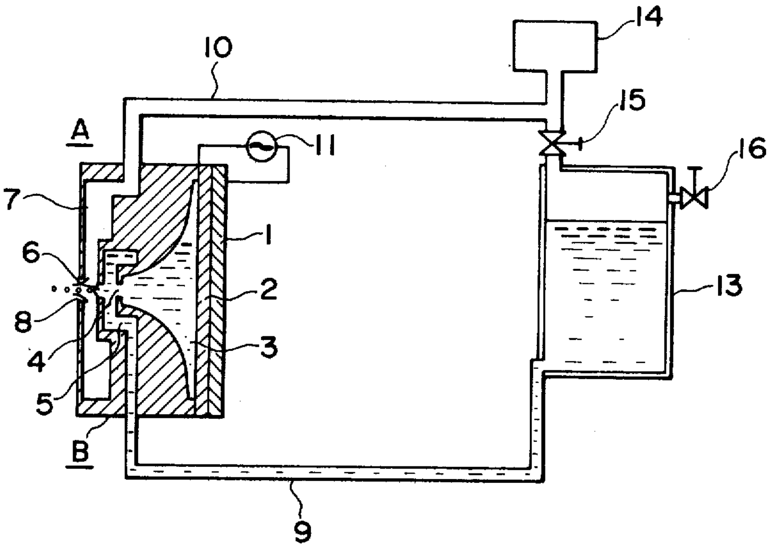
FIG. 1 PRIOR ART
FIG. 1 is an illustration of the prior art ink ejection apparatus.

Before going into the detail of the present invention reference is first made to FIGS. 1–4 in which the conventional ink ejection apparatus is illustrated. FIG. 1 is an illustration of the ink ejection apparatus disclosed in U.S. Pat. No. 4,106,032 granted to M. Miura et al. and assigned to the same assignee of the present invention. The apparatus disclosed in the aforesaid U.S. patent comprises an ink ejecting unit A, an ink supply container 13 and a source of pressurized air 14. The ejecting unit A comprises a piezoelectric transducer 1 secured to a diaphragm 2, both being mounted on the rear of the unit A and connected respectively to the terminals of a signal source 11. The housing B of the ejecting unit A is shaped to form an inner liquid chamber 3 and an outer liquid chamber 5 which are connected by a connecting channel 4, the outer chamber 5 being connected to the ink supply source 13 via a tube 9. The housing B further includes an air chamber 7 forwardly of the outer liquid chamber 5. The air chamber 7 is connected to the air supply source 14 through a tube 10 to provide a stream of air through a nozzle 8 which is coaxially aligned with a liquid ejection nozzle 6. The inner and outer liquid chambers are filled with ink which is ejected through nozzles 6 and 8 when the pressure in the chamber 3 is raised in response to the applicaton of an electrical signal to the piezoelectric transducer 1. The air stream is constantly provided to assist the discharged ink droplets in forming a jet stream and in landing on a same location on a writing surface.

The axial dimension of the air chamber 7 adjacent to the nozzles 6 and 8 is 80 micrometers or less to provide minute changes in shades or gradation and a lowering of the minimum operating voltage of the ejecting unit.

The apparatus further includes air pressure regulating valves 15 and 16 to prevent the ink in the outer chamber 5 from being forced forward by the action of the air stream in the absence of the drive signal.

Figure 2:
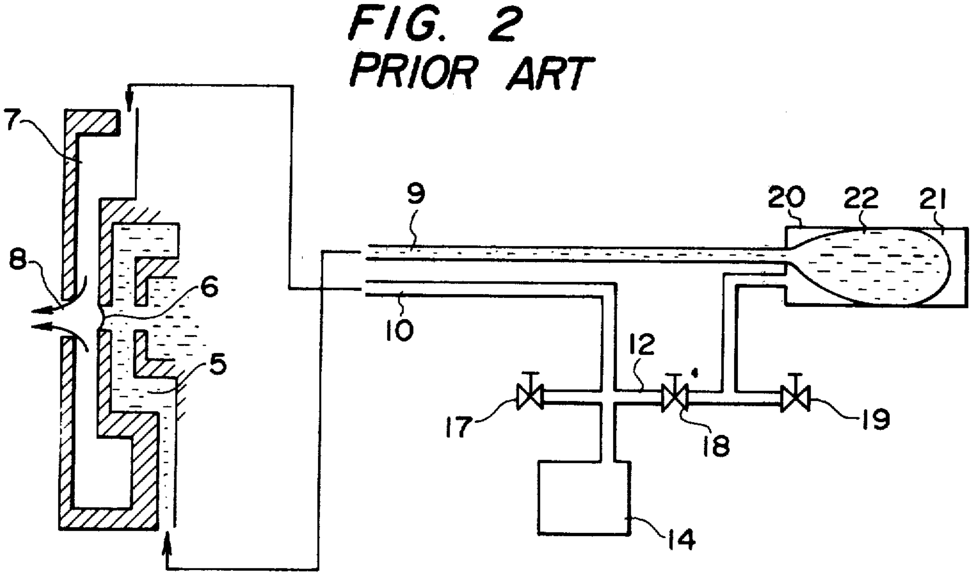
FIG. 2 PRIOR ART
FIG. 2 is an illustration of the detail of the FIG. 1 apparatus.

The following is a description of the detail of the regulating valves in connection with FIG. 2 in which like elements are numbered with like reference numerals used in FIG. 1 and only relevant parts are illustrated in greater detail.

In FIG. 2, a vent regulating valve 17 is connected to the conduit 10 to regulate the air pressure in the chamber 7. The liquid supply source is formed by a container 20 in which is provided a liquid-containing flexible bag 22 connected to the outer chamber 5 via duct 9. The remainder part 21 of the container 20 is filled with air supplied from the source 14 through a tube 12 in which a regulating valve 18 is located. Another vent regulating valve 19 is provided at a location between the valve 18 and the container 20. The chamber 21 is air-tightly sealed so that the pressure therein substantially equals the pressure inside the bag 22 and is controlled by the regulating valves 18 and 19. Therefore, the air pressure inside the chamber 7 is under the control of the valve 17 and the liquid pressure inside the bag 22 is under the control of the valves 18 and 19.

Considering now a situation in which the electrical drive signal is not present, the liquid adjacent to the discharge nozzle 6 is held rearward thereof under the surface tensional force of the liquid. This means that under this condition the difference between the liquid pressure adjacent to the nozzle 6 and the air pressure adjacent thereto must fall within a predetermined range. If this conditon is maintained there is no likelihood of the ink being erratically ejected or of the air entering the liquid chamber 5. Assuming that the air pressure is balanced against the liquid pressure at the nozzle 6, the liquid retaining power of surface tension $P_S$ is given by the following relation:

$$|P_l - P_A'| \leqq P_S \quad (1)$$

The liquid pressure $P_l$ at the nozzle 6 is approximately equal to the pressure inside the bag 22 and hence to the pressure in the chamber 21 if flow resistance is negligible in the conduit 9. The pressure $P_A$ in the air chamber 7 remote from the nozzle 6 is approximately equal to the pressure in the conduit 10 adjacent to the source 14 if the flow resistance of the conduit 10 can be ignored.

Since the pressure $P_A$ is generally greater than the pressure $P_A'$, the following relation can be derived from Equation 1:

$$\Delta P_A - P_S \leqq P_A - P_l \leqq \Delta P_A + P_S \quad (2)$$

where, $\Delta P_A = P_A - P_A'$. Equation 2 states that the air and liquid pressures $P_A$ and $P_l$ should be adjusted so that the difference between them lies within a predetermined range.

Figure 3:
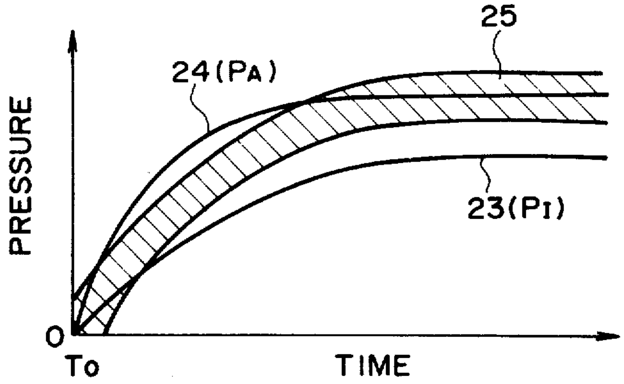
FIG. 3 PRIOR ART
FIGS. 3 and 4 are graphic illustrations of the rise and decay time characteristics respectively of the apparatus of FIG. 2.
Figure 4:
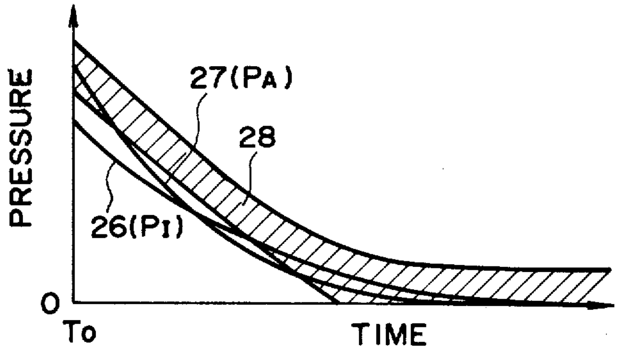
FIG. 4 PRIOR ART

Considering now the rise and fall time characteristics of the apparatus of FIG. 2 with reference to FIGS. 3 and 4. FIG. 3 is a graphic illustration of the rise time characteristic in which the air pressure $P_A$ is shown to adopt a curve designated by numeral 24 and the liquid pressure $P_l$ is shown to adopt a curve 23. The shaded portion 25 indicates a band of stability defined by Equation 2. Stated in another way, the band 25 shows an area in which the air pressure $P_A$ satisfies the condition given by Equation 2 and in this condition the pressure $P_A'$ is statically balanced against the pressure $P_l$ at the nozzle 6. In FIG. 3, the portion of the curve 24 which lies above the shaded area 25 indicates that the equilibrium condition is lost and air is caused to introduce into the outer chamber 5 through the nozzle 6, a phenomenon called liquid backflow. Conversely, if the pressure $P_A$ lies below the region 25, liquid will be caused to eject through the nozzles 6 and 8 into the atomsphere even though the drive signal is not applied to the piezoelectric transducer 1, a phenomen called spontaenous liquid ejection.

As is apparent from FIG. 3, the liquid pressure $P_l$ exhibits a slower response time than the air pressure $P_A$ when the air supply source 14 is energized at time $T_0$, causing the air pressure $P_A$ to rise above the stability area 25. This difference in response time arises from the fact that the chamber 21 of the container 20 has a large volume compared with the air chamber 7, producing a damping effect in response to the rapid pressure increase.

FIG. 4 is a graphic illustration of the decay response characteristic of the FIG. 2 apparatus when the air supply source 14 is de-energized. Curves 26 and 27 respectively represent the pressures $P_l$ and $P_A$ and the shaded area 28 represents the stability region of pressure $P_A$. As illustrated in FIG. 4, the pressure $P_A$ has a smaller decay time than the pressure $P_l$ so that its curve tends to reduce below the stability region 28 for a certain period of time after the air supply source 14 is de-energized. This causes the ink to be ejected into the atmosphere spontaneously in the absence of electrical drive signals. Therefore, the comparatively large sized air chamber 21 and the valve 18 in the passage 12 result in the difference in both rise and fall responses between the air pressure $P_A$ and the liquid or ink pressure $P_l$ when the air supply source 14 is energized or de-energized.

Figure 5:
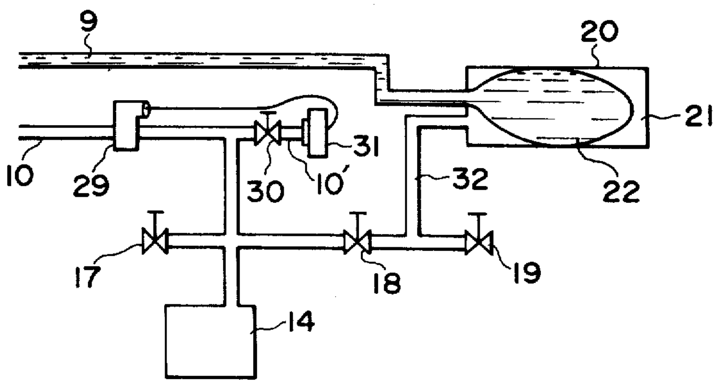
FIG. 5 is an illustration of an embodiment of the present invention.

An embodiment according to the present invention is illustrated in FIG. 5 in which only the portion of the apparatus where the improvement is provided is shown and the other portion is omitted to avoid redundancy. The improvement involves the use of an ON-OFF control valve 29 provided in the air passage 10 to close or open its passage in response to a signal applied thereto, a timing control valve 30 disposed in a passage 10' connected to the passage 10 at one end thereto, and a pressure sensor 31 provided at the other end of the passage 10' to supply a control signal to the ON-OFF valve 29. The pressure sensor 31 is thus in communication with the air supply source 14 via the timing control valve 30 to generate a valve open signal to the valve 29 when the pressure applied to the sensor 31 is above a predetermined value and generate a valve close signal when the pressure reduces below that predetermined value. The effect of the timing control valve 30 is to adjust the rise time of the pressure applied to the pressure sensor 31 and hence to adjust the operating time of the ON-OFF valve 29. The locations of the sensor 31 and the timing control valve 30 are not limited to the passage adjacent to the air supply source 14. They can be installed anywhere in so far as it represents pressure variations corresponding to the pressure variations of the air supply source 14, for example, in the air passage 32 leading from the regulating valve 18 to the chamber 21.

Figure 6:
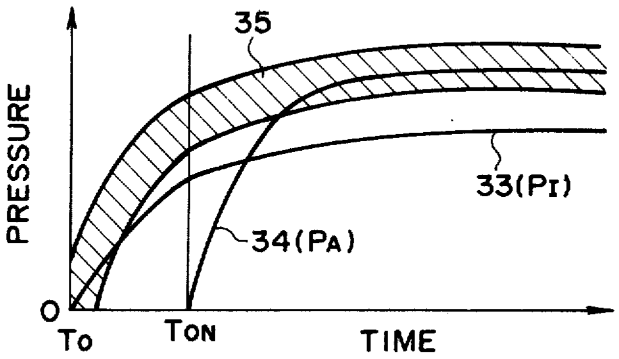
FIG. 6 is a graphic illustration of the rise time characteristic of the FIG. 5 embodiment.

The response characteristics of the embodiment of FIG. 5 are illustrated in FIG. 6. When the air supply source 14 is energized at time $T_0$, the pressure applied to the sensor 31 is below the preset value so that it delivers a valve close signal to the ON-OFF valve 29, whereby the pressure $P_A$ in the air chamber 7 corresponds to the atmospheric pressure which is designated "0" in FIG. 6. When the pressure level reaches the preset value, the sensor 31 generates a valve open signal at time $T_{ON}$, so that the air pressure in chamber 7 rises sharply and its characteristic curve 34 enters the stability region 35. On the other hand, the pressure $P_I$ adopts a curve 33. The time point $T_{ON}$ can be adjusted by the valve 30.

Therefore, the curve 34 stays below the stability region 35 for a certain period of time after the turn-on of the valve 29, causing spontaneous ejection of ink to the atmosphere.

It is thus appreciated that the embodiment of FIG. 5 can effectively solve the problem of ink backflow, which problem is more serious than the problem of spontaneous ejection of ink.

Figure 7:
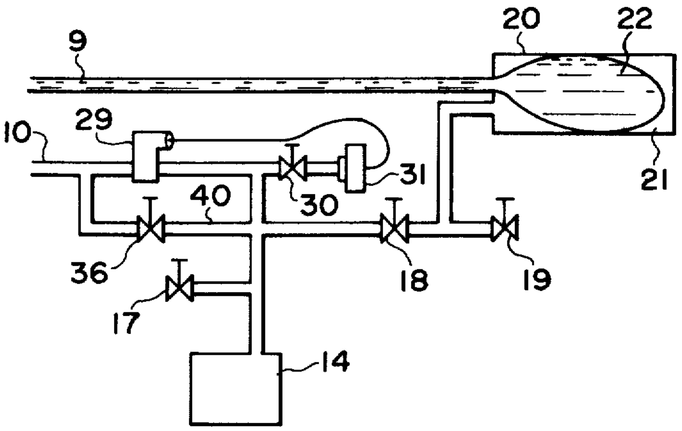
FIG. 7 is an illustration of a modified form of the FIG. 5 embodiment.
Figure 8:
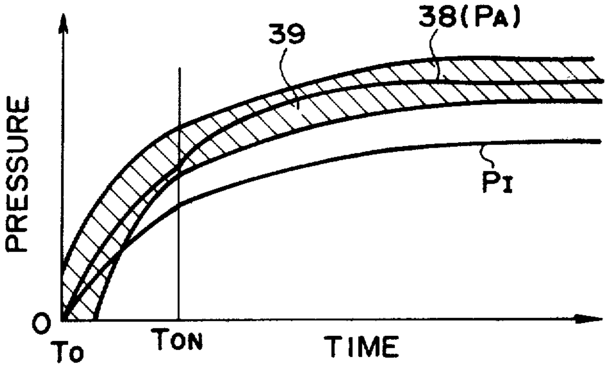
FIG. 8 is a graphic illustration of the embodiment of FIG. 7.

Another embodiment of the invention shown in FIG. 7 is to simultaneously solve the problems of ink backflow and spontaneous ejection. In FIG. 7, a bypass passage 40 is connected in parallel with the ON-OFF control valve 29 and a regulating valve 36 is provided in the bypass passage 40. The regulating valve 36 is used to provide adjustment of the initial pressure increase in the air chamber 7 in response to the source 14 being energized by allowing a certain amount of air to be introduced into the chamber 7 prior to the opening of the valve 29. The regulating valve 36 is so adjusted that the initial pressure rise in the air chamber 7 follows a curve 38 which lies within the stability or equilibrium region 39 as illustrated in FIG. 8. The timing control valve 30 allows the pressure sensor 31 to generate a valve open signal at a desired point in time so that time $T_{ON}$ of the valve 29 can be adjusted to a desired point on the time axis of FIG. 8 so that the curve entirely lies within the shaded equilibrium region 39.

Figure 9:
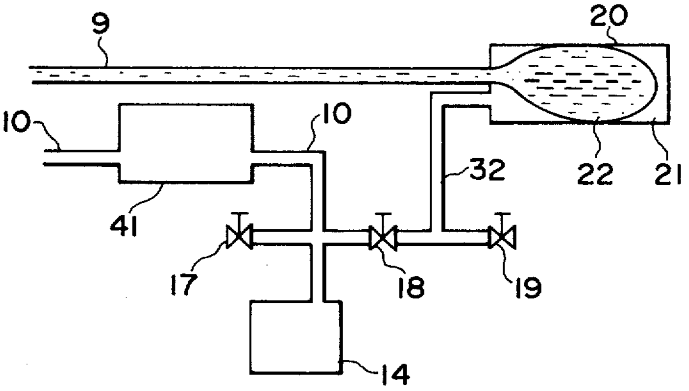
FIG. 9 is an illustration of another embodiment of the invention.
Figure 10:
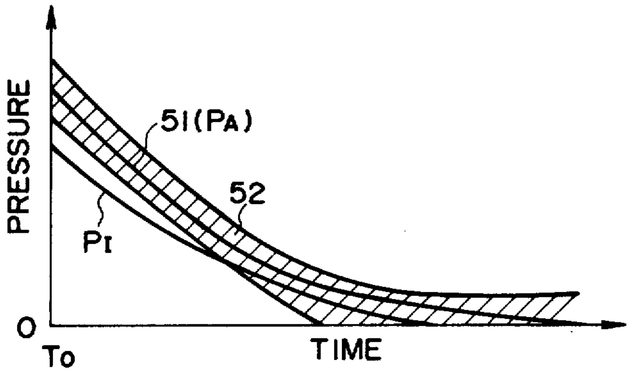
FIG. 10 is a graphic illustration of the decay time characteristic of the apparatus of FIG. 9.

The decay response characteristic of the ink ejection system is improved by the provision of an intermediate reservoir air chamber 41 as illustrated in FIG. 9. This intermediate chamber is provided in the passage 10 through which the air supplied from the source 14 is transmitted to the air chamber 7. The chamber 41 serves to retard a rapid pressure decrease which occurs in response to de-energization of the source 14 and as a result the decay period of the pressure $P_a$ is increased. By suitably selecting the volume of the intermediate air chamber 41 in relation to the volume of the chamber 21, the air pressure $P_A$ can be balanced against the ink pressure $P_I$. As graphically represented in FIG. 10, the air pressure $P_A$ adopts a curve 51 which lies within the stability area 52 by the retarding action of the air reservoir 41, thereby eliminating the problem of spontaneous ejection of ink droplets to the atmosphere at the instant the air supply source 14 is de-energized.

It is to be noted that the air reservoir 41 has also the effect of retarding the initial pressure rise in the air chamber 7 at the instant the air supply source 14 is energized. This causes the air pressure $P_A$ to increase at a lower rate corresponding to the rate of pressure $P_I$ increase so that the pressure $P_A$ curve falls within the stability area.

Since the volume of air chamber 21 increases inversely as a function of the volume of ink held within the bag 22, the decay time of the pressure $P_I$ tends to vary as a function of consumption of ink. This phenomenon becomes severe when the liquid bag 22 has a relatively large volume. Therefore, the pressure equilibrium conditon will be lost. More specifically, an increase in the volume of chamber 21 will result in an increase in the decay period of the ink pressure $P_I$ when the volume of air reservoir 41 is chosen so as to correspond to the maximum volume of the bag 22. This causes spontaneous ejection of ink droplets. On the other hand, if the volume of reservoir 41 is selected so that it corresponds to the minimum volume of the bag 22, the ink pressure $P_I$ initially has a short decay time as compared to the decay time of pressure $P_A$, causing backflow of ink.

Figure 11:
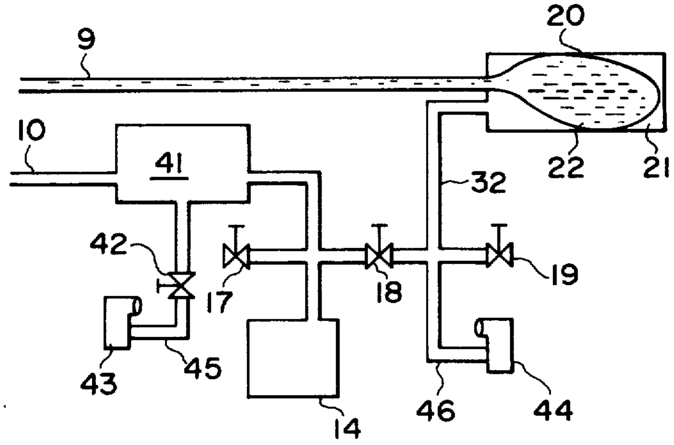
FIG. 11 is an illustration of a modified form of the embodiment of FIG. 9.
Figure 12:
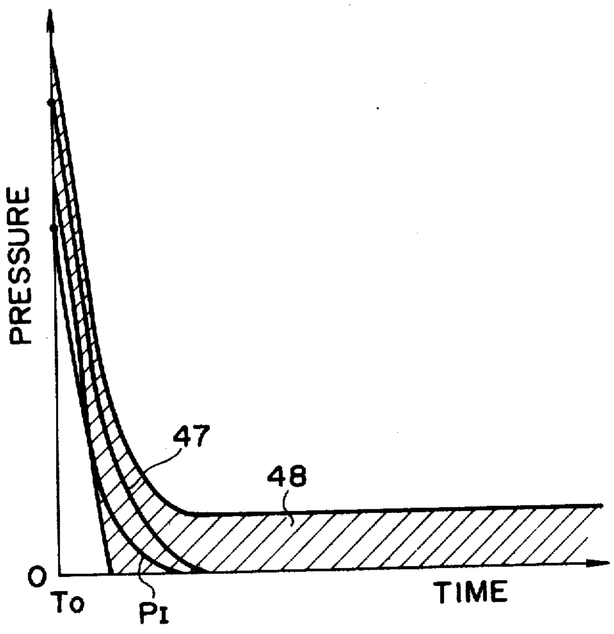
FIG. 12 is a graphic illustration of the decay response characteristics of the apparatus of FIG. 11.

An embodiment shown in FIG. 11 is to solve this pressure imbalance problem which occurs as a result of the variation of the volume of chamber 21 with respect to the constant volume of air reservoir 41. The FIG. 11 embodiment differs from the embodiment of FIG. 9 in that it further includes a vent passage 45 connected to the air reservoir 41 and an On-OFF control valve 43 connected to the open end of the passage 45, and a regulating valve 42 connected between the valve 43 and the chamber 41. Also included is another ON-OFF control valve 44 which is connected to the open end of a passage 46 leading to the air supply source 14 via the regulating valve 18. The ON-OFF control valves 43 and 44 are controlled by a circuit, not shown, so that they remain closed when the air supply source 14 is being energized. Therefore, at the instant the air supply source 14 is de-energized, the ON-OFF valves 43 and 44 are opened to instantly reduce air pressure in the reservoir 41 and chamber 21. As a result, the interval during which the ink backflow or spontaneous ink ejection might occur, and hence the extent of such undesirable consequences is reduced to a minimum. Since, however, the control valves 43 and 44 offer a certain amount of resistance to the air flow, there is a certain amount of decay period which cannot be ignored and during this decay period a pressure imbalance could occur with a resultant undesirable consequence. The regulating valve 42 is provided for the purpose of allowing adjustment of the decay period of the air pressure $P_A$ to minimize the undesirable consequence during such short decay period. FIG. 12 is an illustration of the decay response characteristics of the apparatus of FIG. 11 with a numeral 47 designating the air pressure $P_A$ falling within the stability area 48. Because of the short decay periods, the pressure imbalance which might occur as a result of variation in the volume of chamber 21 as a function of time, can effectively be minimized.

Figure 13:
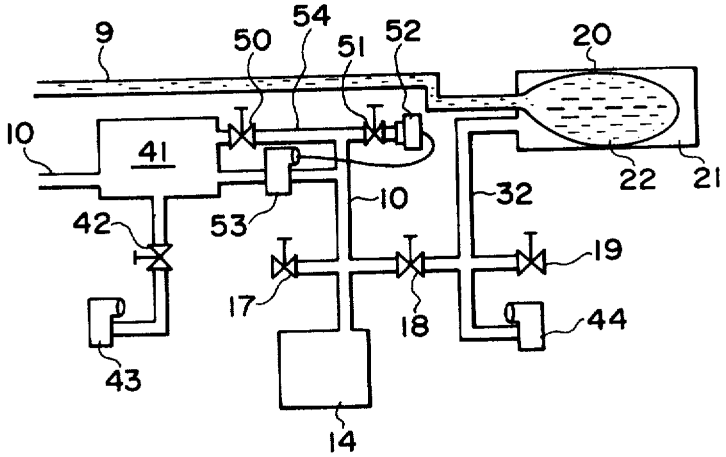
FIG. 13 is an illustration of a further modification of the embodiment of FIG. 9.

FIG. 13 is an illustration of a further embodiment of the invention of which the rise time response characteristics are improved over the apparatus of FIG. 11. The FIG. 13 embodiment further includes, in addition to the apparatus of FIG. 11, a normally closed ON-OFF control valve 53 provided in the conduit 10 between the air reservoir 41 and the source 14, a pressure regulating valve 50 provided in a bypass conduit 54 connected in parallel with the ON-OFF control valve 53, and a pressure sensor 52 connected to the air supply source 14 via a regulating valve 51.

The regulating valve 50 and passage 54 are provided for the purpose of allowing a portion of the air in the conduit 10 on the inlet side of the reservoir 41 to bypass the ON-OFF control valve 53 so that the pressure inside the reservoir 41 gradually increases as a function of time. The pressure sensor 52 senses the air pressure at the inlet port of the reservoir 41 and delivers a valve open signal to the normally closed ON-OFF valve 53 when a predetermined pressure is reached, whereby the reservoir 41 is thereafter filled with air supplied through conduit 54 and ON-OFF control valve 53. The rise time characteristics obtained from the FIG. 13 apparatus are generally similar to those shown in FIG. 6.

What is claimed is:

1. An ink ejection apparatus comprising an ink ejecting unit including means for forming an air chamber, a liquid chamber rearwardly of said air chamber for holding ink therein and axially aligned first and second discharge channels for allowing air to be discharged through said first discharge channel and allowing ink to be discharged through said first and second discharge channels; means mounted adjacent to said liquid chamber for generating rapid pressure rises in said liquid chamber in response to electrical signals for discharging said ink through said aligned discharge channels into the atmosphere; an ink container for holding ink therein and supplying the ink to said liquid chamber; a source for generating pressurized air when energized; a first conduit for supplying said pressurized air to said air chamber to provide a stream of air through said first discharge channel into the atmosphere; a second conduit fo supplying said pressurized air to said liquid container to establish a static balance between the pressures in said air and liquid chambers in a region adjacent to said second discharge channel, said ink container being partially filled with the pressurized air the volume of which is greater than the volume of air in said air chamber; and means for imparting a retarding action to a transitory variation of air pressure in said first conduit to prevent the pressure in said region of said air chamber from exceeding the pressure in said region of said liquid chamber when said pressurized air generating source is energized.

2. An ink ejection apparatus as claimed in claim 1, wherein said retarding means comprises means for detecting the pressure in said first conduit and generating a signal when said detected pressure is above a predetermined value and means for normally closing said first conduit and opening the same in response to said pressure responsive signal.

3. An ink ejection apparatus as claimed in claim 2, further comprising a pressure regulating valve for regulating the pressure applied to said pressure detecting means to permit adjustment of the opening time of said conduit opening means with respect to the time of energization of said pressurized air generating source.

4. A ink ejection apparatus as claimed in claim 2 or 3, further comprising a third conduit connected in parallel with said conduit opening means to allow a portion of the air in said first conduit to bypass said conduit opening means to gradually increase the pressure in said air chamber in response to the energization of said pressurized air generating source.

5. An ink ejection apparatus as claimed in claim 1, wherein said retarding means comprises means forming a second air chamber in said first conduit, the volume of said second air chamber being greater than the volume of air in said first conduit.

6. An ink ejection apparatus as claimed in claim 5, further comprising a first normally closed ON-OFF valve connected to said second air chamber and operable to open in response to de-energization of said pressurized air generating source to decrease the pressure in said second air chamber, and a second normally closed ON-OFF valve connected to said liquid container and operable to open in response to the de-energization of said pressurized air generating source to release the air to be supplied to said liquid container to the atmosphere.

7. An ink ejection apparatus as claimed in claim 5 or 6, further comprising a third normally closed ON-OFF valve connected in said first conduit between said pressurized air generating source and said second air chamber, a bypass conudit connected in parallel with said third ON-OFF valve for allowing a portion of the air in said first conduit to pass to said second air chamber, and means for detecting the pressure in said first conduit for causing said third ON-OFF valve to open when the detected pressure rises above a predetermined value.

8. An ink ejection apparatus as claimed in claim 7, further comprising a pressure regulating valve provided in said bypass conduit.

9. An ink ejection apparatus as claimed in claim 8, further comprising a second pressure regulating valve for regulating the pressure applied to said pressure detecting means.

* * * * *